United States Defensive Publication [19] (H) [11] T961,009

Hendy [43] Aug. 2, 1977

[54] ORIENTED POLYOLEFIN FILM TREATED WITH AMINE SULPHATES

[75] Inventor: Brian Norman Hendy, Welwyn, England

[73] Assignee: Imperial Chemical Industries Limited, London, England

[21] Appl. No.: 762,166

[22] Filed: Jan. 24, 1977

[30] Foreign Application Priority Data

Feb. 6, 1976 United Kingdom ..... 4769/76
Apr. 9, 1976 United Kingdom ..... 14547/76

[51] Int. Cl.[2] ..... B05D 1/00; B05D 3/00
[52] U.S. Cl. ..... 427/401; 427/171; 427/384; 428/500; 428/910; 252/8.8

[57] ABSTRACT

Antistatic polyolefin films, particularly oriented polyolefin, are produced by extruding a polyolefin to form a cast extrudate, and applying to at least one surface of the cast extrudate a solution or dispersion in a volatile vehicle an amine sulfate or mixture of amine sulfates having the general formula

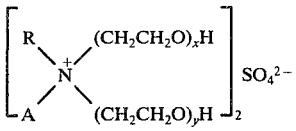

where $x$ is a positive integer, $y$ is zero or a positive integer, the sum of $x$ and $y$ is from 2 to 5, A is a hydrogen atom and when $y$ is zero A may also be a lower alkyl group, and R is a univalent aliphatic radical containing from 8 to 22 carbon atoms, and afterwards heating and stretching the extrudate to orient it. Preferred materials include amine sulphates in which the sum of $x + y$ is 2, A is hydrogen and R is a mixture of aliphatic hydrocarbon radicals having 8 to 18, preferably 12 to 18, carbon atoms particularly those derived from tallow or soya oil or derived from coconut oil. Examples of suitable amines from which amine sulfates may be prepared are the Endomeen's T/12, S/12 and C/12. It has been found that the corresponding hydrochloride does not provide the oriented film with satisfactory properties. The amine sulfate is conveniently employed at a concentration of up to about 60% by weight of the solution or dispersion and preferably from 10 to 50%.

Preferably the solution or dispersion also contains as a supplementary additive a quaternary ammonium compound of the general formula:

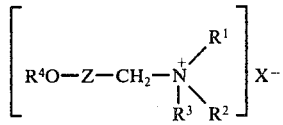

where each of $R^1$, $R^2$, and $R^3$, which may be the same or different, is a hydrogen atom or a lower alkyl radical, or $R^1$ and $R^2$ are each methylene groupings within a common five- or six-membered saturated heterocyclic ring, Z is a methylene group when $R^4$ is a hydrogen atom or an acyl radical containing up to 15 carbon atoms, or Z is a carbonyl group when $R^4$ is a hydrogen atom, and X is a univalent anion or an equivalent of a multivalent anion. The preferred quaternary ammonium compound is choline chloride. The presence of the quaternary ammonium compound in the solution or dispersions reduces the amount of amine sulfate to about 0.25 to 2.5% required to achieve the desired film properties, the total concentration of the amine sulfate and additional additive within the range of up to 60%.

12 Claims, No Sheets Drawing,

20 Pages Specification

The file of this unexamined application may be inspected and copies thereof may be purchased (849 O.G. 1221, Apr. 9, 1968).